P. J. McGRATH.
LAWN MOWER SHEARS.
APPLICATION FILED AUG. 8, 1916.
1,214,562.
Patented Feb. 6, 1917.
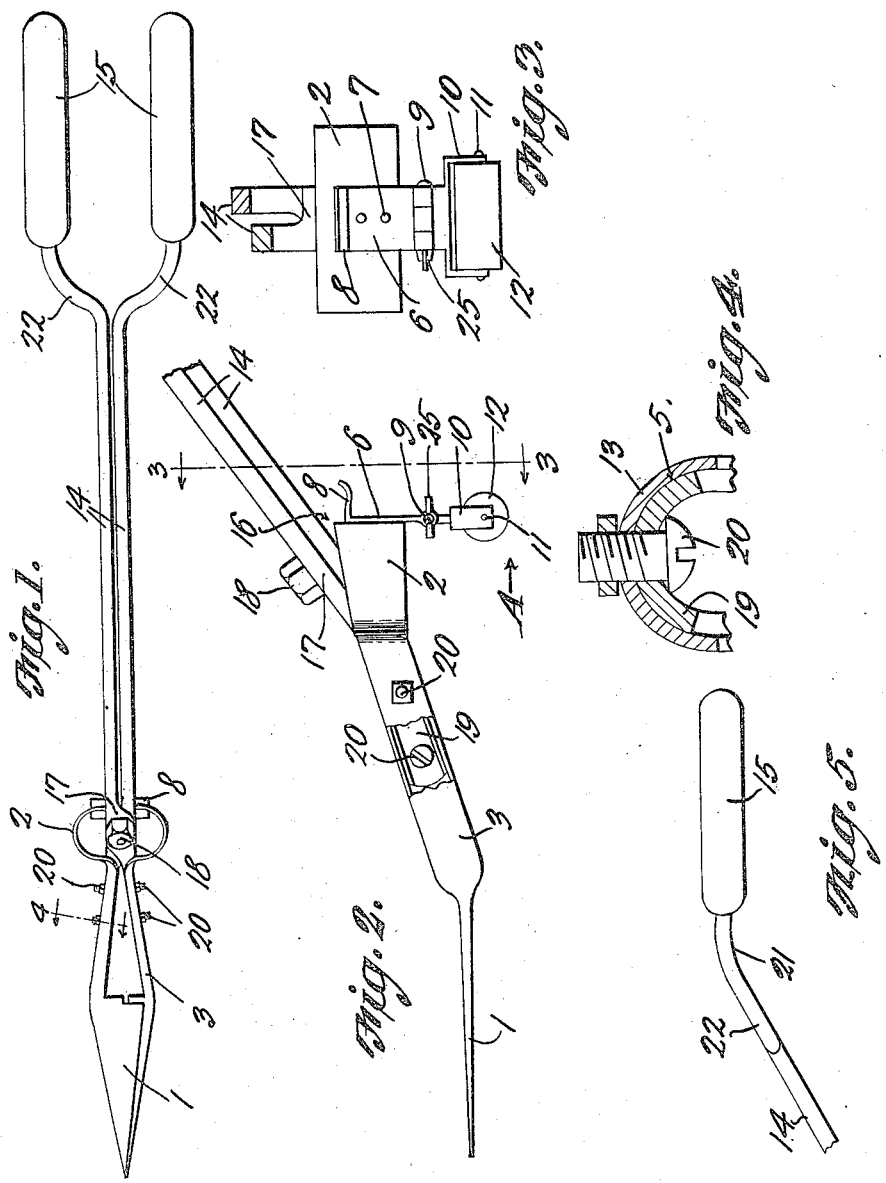

UNITED STATES PATENT OFFICE.

PATRICK JOHN McGRATH, OF ELIZABETH, NEW JERSEY.

LAWN-MOWER SHEARS.

1,214,562.  Specification of Letters Patent.  Patented Feb. 6, 1917.

Application filed August 8, 1916. Serial No. 113,790.

*To all whom it may concern:*

Be it known that I, PATRICK J. MCGRATH, a citizen of the United States, residing at Elizabeth, in the county of Union and State of New Jersey, have invented a new and useful Lawn-Mower Shears, of which the following is a specification.

The device forming the subject matter of this application is a pair of shears adapted to be used for trimming grass and for like purposes, and the invention aims, primarily, to provide a structure of this type which may be used without compelling the operator to assume a stooping or recumbent position.

The invention aims to provide novel means whereby the operating levers are assembled with the shears, to provide novel means for mounting the ground engaging roller so that the same may or may not be used, at the will of an operator, and so to connect the operating levers with the shears that the back spring may operate properly and without undue straining, due to the action of the levers.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—Figure 1 shows in top plan, a device constructed in accordance with the present invention; Fig. 2 is a side elevation, parts being broken away; Fig. 3 is a section on the line 3—3 of Fig. 2, Fig. 3 being in the nature of a rear elevation; and Fig. 4 is a cross section on the line 4—4 of Fig. 1. Fig. 5 is a fragmental side elevation showing one of the levers.

In carrying out the present invention there is provided a pair of shears including blades 1, a back spring 2, and connections 3 uniting the blades 1 with the back spring 2. The connections 3 are concaved as shown at 5, upon their inner faces, to form seats.

Secured to the exterior face of the back spring 2 by means of attaching elements 7 is a vertical strip 6, the upper end of which is bent rearwardly to form a spring tongue 8. Pivoted as shown at 9 to the lower end of the strip 6 is a U-shaped frame 10, the arms of which carry an axle 11 supporting a rotatable, ground-engaging roller 12.

The numeral 14 designates a pair of levers which, adjacent their free rear ends, are offset as shown at 22. When viewed in side elevation, the levers are curved as shown at 21, adjacent their offset portions 22, so that the rear, free ends of the levers will lie more nearly in a horizontal plane than do the body portions of the levers, when the structure is in use. The rear ends of the levers 14 carry handles 15. The levers 14 are crossed as shown at 17 and are connected at their point of crossing by a pivot element 18 which may be a bolt and nut. The levers 14 terminate at their forward ends in fingers 19, extended longitudinally of the connections 3 and lying in the concaved seats 5. Securing elements 20 unite the fingers 19 with the connections 3. The fingers 19 are disposed at an obtuse angle to the body portions of the levers 14. Consequently, when the shears are in a substantially horizontal position, the body portions of the levers 14 will extend upwardly and rearwardly, and the handles 15 will be disposed in a substantially horizontal plane. This construction, obviously, facilitates the use of the device and renders it unnecessary for the operator to assume a stooping or recumbent position.

When viewed in top plan, the pivot element 18 which connects the levers 14 lies within the contour of the back spring 2. Consequently, the back spring is not strained unduly when the levers are manipulated. Noting the point at which the reference character 16 is applied, it will be observed that the levers 14 are spaced from the back spring 2, and consequently, the back spring can operate without being interfered with by the levers. The fingers 19 of the levers are housed in an out-of-the-way position within the concaved seats 5 of the connections 3 and are securely united therewith, the strength of the structure being greatly enhanced by the construction last above enumerated.

When it is desired to use the roller 12 as a support, the frame 10 is swung downwardly on its pivotal mounting 9, but when it is desired to use the structure without employing the roller 12, then the frame 10 is swung upwardly until the roller 12 is engaged by the tongue 8.

The pivot means 9 may be a bolt carrying a wing nut 25. By tightening up the wing nut 25 the roller 12 will be prevented from swinging rearwardly in the direction of the arrow A when the roller rides over the ground.

At times it may be desirable to have the blades 1 work closer to the ground than is possible when the structure is disposed as shown in Fig. 2, and still have the blades 1 work parallel to the surface of the ground. Under such circumstances, the roller 12 may be turned up and made to engage with the tongue 8. It is obvious that, when the structure is disposed as shown in Fig. 2, if the device were tilted forwardly with the roller 12 in engagement with the ground, the points only of the blades 1 would work near to the ground.

Having thus described the invention, what is claimed is:

1. In a device of the class described, a pair of shears comprising blades, a back spring, and connections uniting the blades with the back spring, the connections being provided upon their inner faces with longitudinally extended concaved seats; and a pair of levers including fingers disposed at an angle to the body portions of the levers, the fingers being received in the seats and coacting with the inner faces of the connections; and securing devices uniting the fingers with the connections.

2. In a device of the class described, a pair of shears comprising blades, a back spring, and connections uniting the blades with the back spring; a pair of levers assembled with the connections; a frame pivoted to the back spring for raising and lowering; and a ground-engaging roller journaled in the frame.

3. In a device of the class described, a pair of shears comprising blades, a back spring, and connections uniting the blades with the back spring; a pair of levers assembled with the connection; a frame pivoted to the back spring for raising and lowering; a ground-engaging roller journaled on the frame; and means for holding the frame and the roller in an upturned position.

In testimony that I claim the foregoing as my own, I have thereto affixed my signature in the presence of two witnesses.

PATRICK JOHN McGRATH.

Witnesses:
F. LEROY NEWCOMB,
WALTON B. KILLOUGH.